United States Patent
Kubo et al.

(10) Patent No.: US 11,885,107 B2
(45) Date of Patent: Jan. 30, 2024

(54) HOSE SUPPORT STRUCTURE, LINK FOR WORK VEHICLE, AND WORK VEHICLE

(71) Applicant: Kubota Corporation, Osaka (JP)

(72) Inventors: Takahiro Kubo, Sakai (JP); Toyoharu Hashima, Sakai (JP); Yoshihiro Ebata, Sakai (JP)

(73) Assignee: KUBOTA CORPORATION, Osaka (JP)

(*) Notice: Subject to any disclaimer, the term of this patent is extended or adjusted under 35 U.S.C. 154(b) by 105 days.

(21) Appl. No.: 17/840,612

(22) Filed: Jun. 15, 2022

(65) Prior Publication Data
US 2023/0034690 A1    Feb. 2, 2023

(30) Foreign Application Priority Data
Jul. 29, 2021    (JP) ................................ 2021-123898

(51) Int. Cl.
   *E02F 9/22*     (2006.01)
   *F16L 3/01*     (2006.01)

(52) U.S. Cl.
   CPC .............. *E02F 9/2275* (2013.01); *F16L 3/01* (2013.01)

(58) Field of Classification Search
   CPC ................... F16L 3/01; E02F 9/2275
   See application file for complete search history.

(56) References Cited

U.S. PATENT DOCUMENTS

| | | | |
|---|---|---|---|
| 7,854,284 B2 * | 12/2010 | Wada ................ | E02F 9/2275 180/6.58 |
| 8,246,286 B2 * | 8/2012 | Fukudome .......... | E02F 3/382 414/724 |
| 10,030,365 B2 * | 7/2018 | Okura ................ | E02F 9/2275 |
| 10,648,158 B1 * | 5/2020 | Smith ................. | B60R 16/03 |
| 2022/0090361 A1 | 3/2022 | Shobu et al. | |

FOREIGN PATENT DOCUMENTS

| | | |
|---|---|---|
| JP | 6436836 B2 | 11/2016 |
| JP | 6570925 B2 | 3/2017 |
| JP | 2020-197086 | 12/2020 |

* cited by examiner

*Primary Examiner* — Kevin F Murphy
(74) *Attorney, Agent, or Firm* — MORI & WARD, LLP

(57) ABSTRACT

A hose support structure includes a first round bar and a second round bar provided on a mounting surface of a first plate and extending in a first direction. A first restraint and a second restraint face the mounting surface in a second direction and are provided between the first round bar and the second round bar in a third direction. The first restraint extends from a first proximal end toward a first distal end in a fourth direction, and the second restraint extends in a fifth direction opposite to the fourth direction from a second proximal end connected to the first proximal end. A third restraint is provided opposite to the second restraint with respect to the first restraint in the first direction. At least a part of the second restraint is separated from the mounting surface by a second distance shorter than the first distance in the second direction.

20 Claims, 17 Drawing Sheets

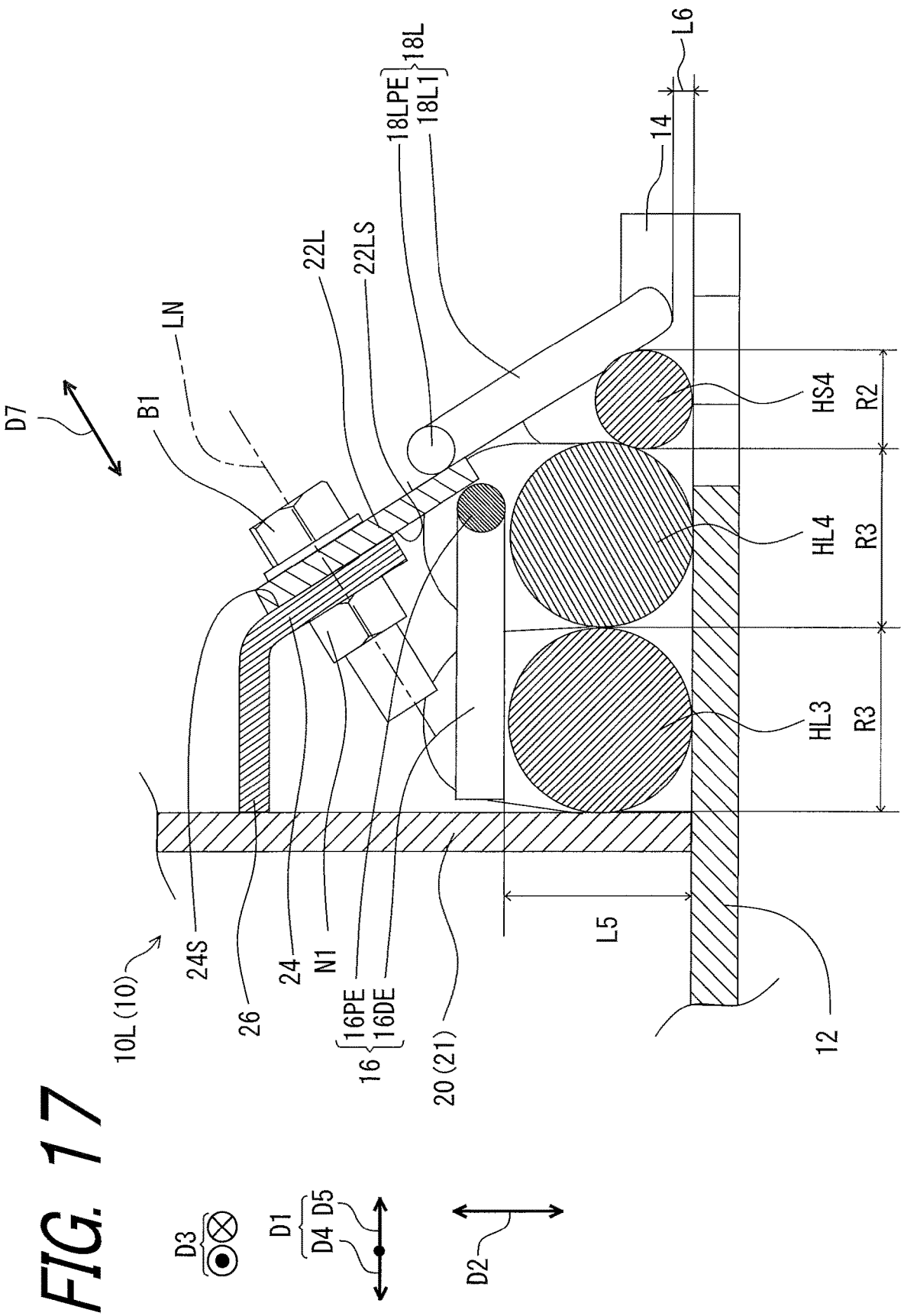

HOSE SUPPORT STRUCTURE, LINK FOR WORK VEHICLE, AND WORK VEHICLE

The present application claims priority under 35 U. S. C. § 119 to Japanese Patent Application No. 2021-123898, filed Jul. 29, 2021. The contents of this application are incorporated herein by reference in their entirety.

BACKGROUND OF THE INVENTION

Field of the Invention

The present invention relates to a hose support structure, a link for a work vehicle, and a work vehicle.

Discussion of the Background

Japanese Patent No. 6436836 discloses a hose support structure which is provided on a member for moving a working device of a work vehicle and possible to hook a hose that sends multiple types of hydraulic fluid.

SUMMARY OF THE INVENTION

According to one aspect of the present disclosure, a hose support structure includes a first plate, a first round bar, and a second round bar, a first restraint, a second restraint, and a third restraint. The first plate has a mounting surface. The first round bar and the second round bar are provided on the mounting surface and extend parallel to each other in a first direction. The first restraint faces the mounting surface in a second direction substantially perpendicular to the mounting surface and perpendicular to the first direction, and is separated from the mounting surface by a first distance in the second direction, the first restraint is provided between the first round bar and the second round bar in a third direction perpendicular to the first and second directions, and extend from a first proximal end toward a first distal end in a fourth direction along the first direction. The second restraint faces the mounting surface in the second direction, is provided between the first round bar and the second round bar in the third direction, and extends in a fifth direction opposite to the fourth direction from a second proximal end that is connected to the first proximal end of the first restraint. The third restraint is provided opposite to the second restraint with respect to the first restraint in the first direction. At least a part of the second restraint is separated from the mounting surface by a second distance shorter than the first distance in the second direction.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIG. 17 is a cross-sectional view taken along the cross-sectional line XVII-XVII' of FIG. 12.

DESCRIPTION OF THE EMBODIMENTS

Figure 1:
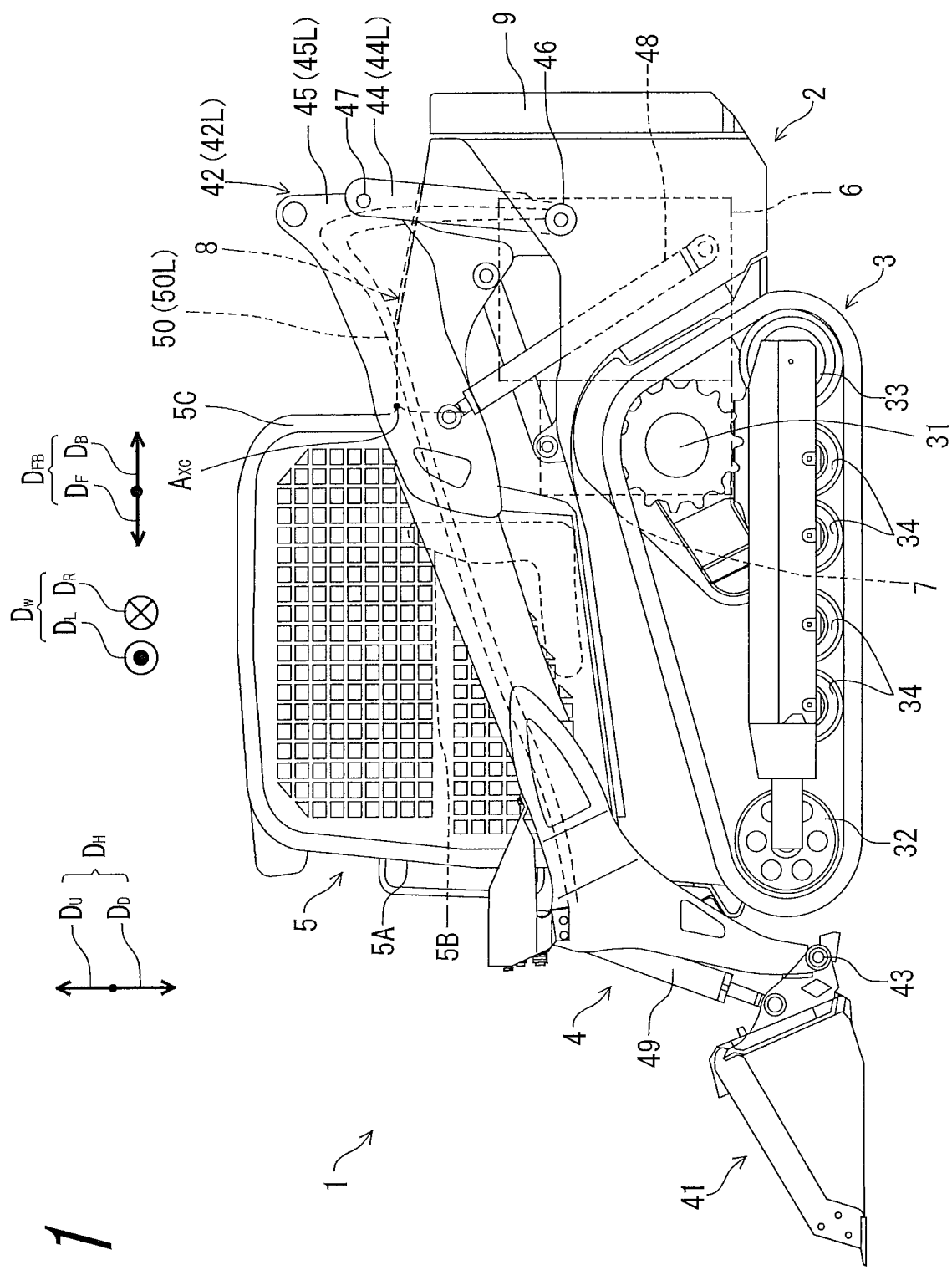
FIG. 1 is a side view of a work vehicle.

Hereinafter, the present invention will be described in detail with reference to drawings showing embodiments thereof. In the drawings, the same reference numerals indicate corresponding or substantially identical configurations.

EMBODIMENTS

<Overall Configuration>

Figure 2:
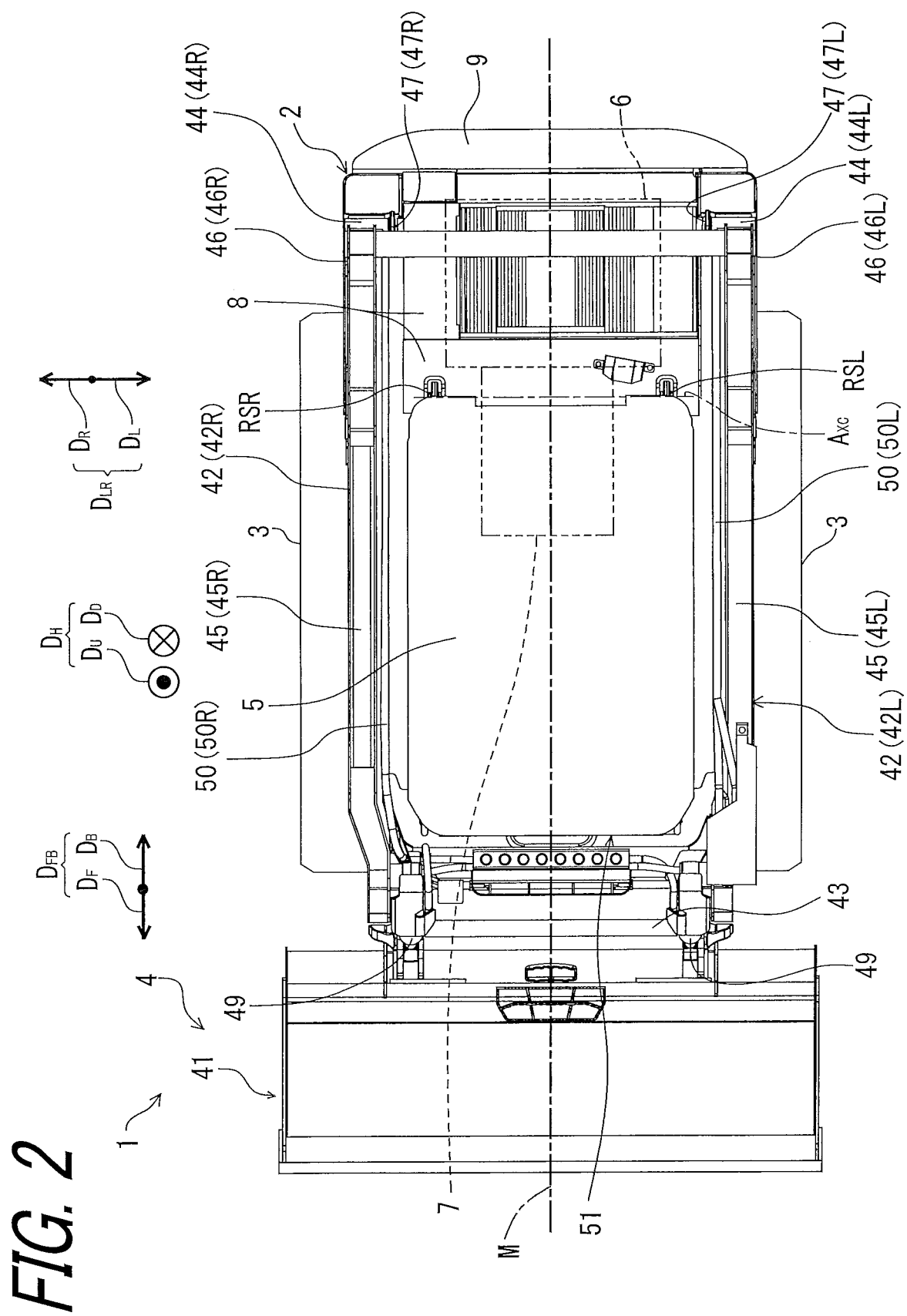
FIG. 2 is a top view of the work vehicle.

Referring to FIGS. 1 and 2, a work vehicle 1, for example, a compact truck loader, includes a vehicle body frame 2, a traveling device 3, a working device 4, and a cabin 5. The vehicle body frame 2 supports the traveling device 3, the working device 4, and the cabin 5. In the illustrated embodiment, the traveling device 3 is a crawler type traveling device. Therefore, the traveling device 3 includes a drive wheel 31, driven wheels 32, 33, and rolling wheels 34. However, the traveling device 3 is not limited to a crawler type traveling device. The traveling device 3 may be, for example, a front wheel/rear wheel traveling device, or a traveling device having a front wheel and a rear crawler. The working device 4 includes a work implement (bucket) 41 at the distal end of the working device 4. A proximal end of the working device 4 is attached to a rear portion of the vehicle body frame 2. The working device 4 includes a pair of arm assemblies 42 for rotatably supporting the bucket 41 via the bucket pivot shaft 43. A pair of arm assemblies 42 has a lift link 44 and an arm 45 respectively.

The lift link 44 is rotatable with respect to the vehicle body frame 2 around a fulcrum shaft 46. The arm 45 is rotatable with respect to the lift link 44 around a joint shaft 47. The working device 4 further includes a plurality of arm cylinders 48 and at least one work implement cylinder 49. Each of the plurality of arm cylinders 48 is rotatably connected to the vehicle body frame 2 and the arm 45, and moves the lift link 44 and the arm 45 to raise and lower the bucket 41. In the following embodiments, the lift link 44 may be simply referred to as a link 44. At least one work implement cylinder 49 is configured to tilt the bucket 41. The cabin 5 is attached to a front portion of the vehicle body frame 2. The work vehicle 1 is provided with a window 5A in front of a cabin 5, and a driver's seat 5B and an operating device (not illustrated) in the cabin 5. The cabin frame 5C shown in FIG. 1 forming the outer shell of the cabin 5 is rotatable about rotational shafts RSL and RSR on the vehicle body frame 2 shown in FIG. 2. In FIGS. 1 and 2, a common rotational axis AXC defined by the rotational axes RSL and RSR is illustrated.

In the embodiment according to the present the embodiment according to the present application, the longitudinal direction $D_{FB}$ (forward $D_F$/rearward $D_B$) means a front/rear direction as seen from an operator seated on the driver's seat 5B of the cabin 5. Left direction $D_L$, right direction $D_R$, and width direction $D_W$ mean left direction, right direction, and left/right direction respectively, as viewed from the operator. Up direction $D_U$, down direction $D_D$; height direction $D_H$. mean an upward direction, a downward direction and a height direction as viewed from the operator. The front/back, left/right (width), up/down (height) directions of the work vehicle 1 correspond to the front/back, left/right (width), up/down (height) directions as viewed from the operator.

FIG. 1 shows the left side of the work vehicle 1. As shown in FIG. 2, the vehicle body frame 2 is substantially symmetrical with respect to the vehicle body center plane M, and among the pair of arm assemblies 42 provided on the left side with respect to the vehicle body center plane M is shown as a first arm assembly 42L, and the arm assembly 42 provided on the right side with respect to the vehicle body center plane M is shown as a second arm assembly 42R. The Lift link 44 provided on the left side with respect to the vehicle body center plane MF is shown as a lift link 44L, and the lift link 44 provided on the right side with respect to the vehicle body center plane M is shown as a second link 44R. An arm 45 provided on the left side with respect to the vehicle body center plane M is shown as a first arm 45L, and an arm 45 provided on the right side with respect to the vehicle body center plane M is shown as a second arm 45R. A fulcrum shaft 46 provided on the left side of the vehicle body center plane M is shown as a first fulcrum shaft 46L, a fulcrum shaft 46 provided on the right side of the vehicle body center plane M is shown as the second fulcrum shaft 46R. A joint shaft 47 provided on the left side with respect to the vehicle body center plane M is shown as a first joint shaft 47L, and a joint shaft 47 provided on the right side with respect to the vehicle body center plane M is shown as a second joint shaft 47R.

Referring to FIGS. 1 and 2, the work vehicle 1 further includes an engine 6 provided at a rear portion of the vehicle body frame 2. The engine 6 is configured to provide driving force to the traveling device 3 and the working device 4. The engine 6 is provided between a pair of arm assemblies 42 in the width direction $D_W$ of the work vehicle 1. The work vehicle 1 is further provided with a cover 8 for covering the engine 6. The work vehicle 1 further includes a bonnet cover 9 provided at the rear end of the vehicle body frame 2. The bonnet cover 9 is openable and closable such that a maintenance worker can perform maintenance work on the engine 6 and the like.

Referring to FIG. 1, an engine 6 is connected to a hydraulic pump 7 which is driven by the engine 6 and supplies hydraulic fluid. The hydraulic pump 7 includes a traveling hydraulic pump for supplying hydraulic fluid to a hydraulic motor for driving a drive wheel 31, and a working hydraulic pump for supplying hydraulic fluid to a plurality of arm cylinders 48 and at least one work implement cylinder 49. The work vehicle 1 further includes a lift link 44 and a plurality of hydraulic hoses 50 passing over the arm 45 for supplying hydraulic fluid to at least one work implement cylinder 49. In FIG. 2, a plurality of hydraulic hoses 50 passing through the first link 44L and the first arm 45L are shown as a hydraulic hose 50L. A plurality of hydraulic hoses 50 passing through the second link 44R and the second arm 45R is shown as a hydraulic hose 50R.

Figure 3:
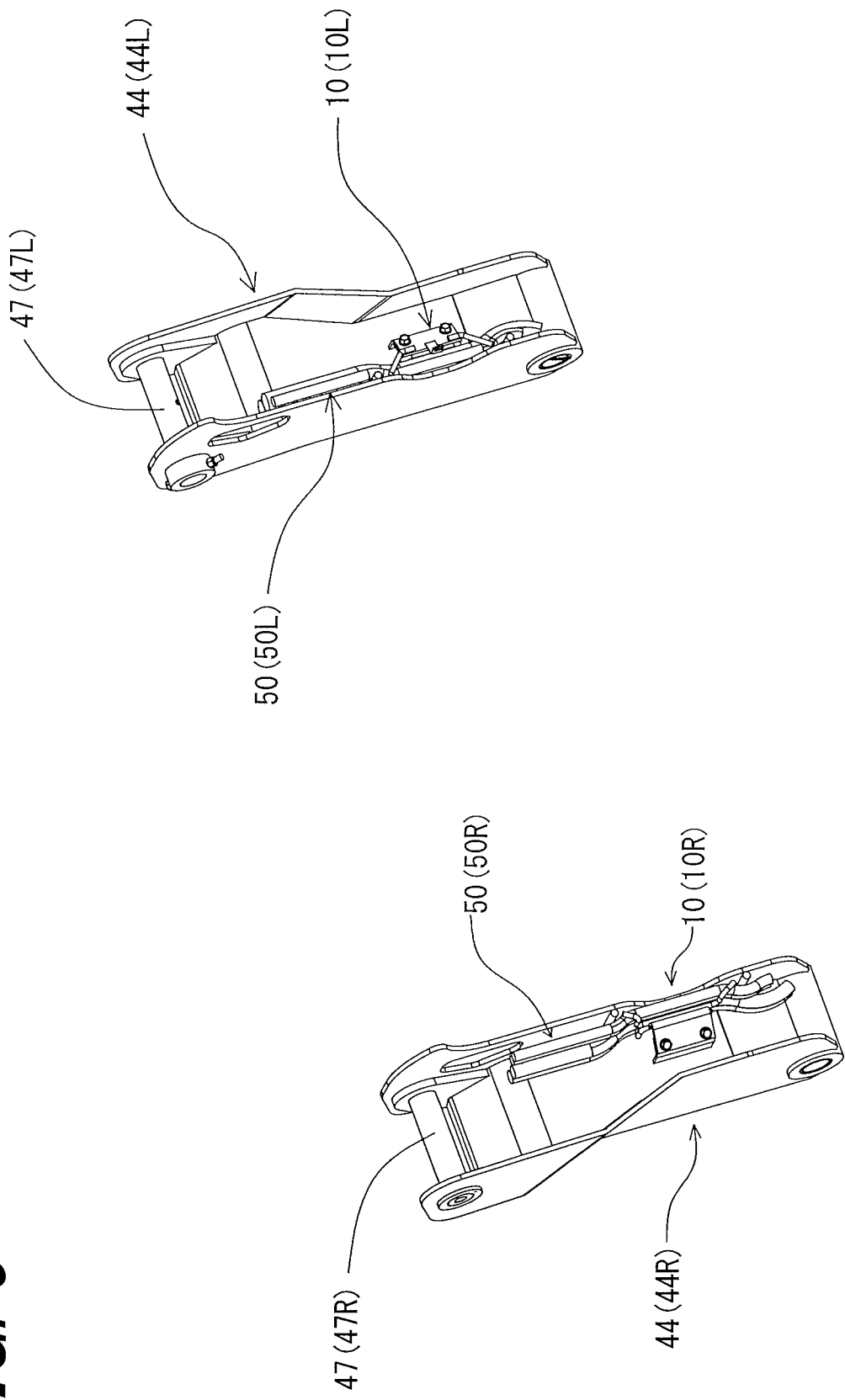
FIG. 3 is an enlarged perspective view showing a first link, a second link, and a plurality of hydraulic hoses passing through the first and the second links.

FIG. 3 is an enlarged perspective view showing a first link 44L, a second link 44R, and a plurality of hydraulic hoses 50L and 50R passing through the first and the second links. As shown in FIG. 3, the first link 44L includes a first hose support structure 10L, and the second link 44R includes a second hose support structure 10R. In the following embodiments, the first hose support structure 10L and the second hose support structure 10R are collectively referred to as the hose support structure 10.

Figure 4:
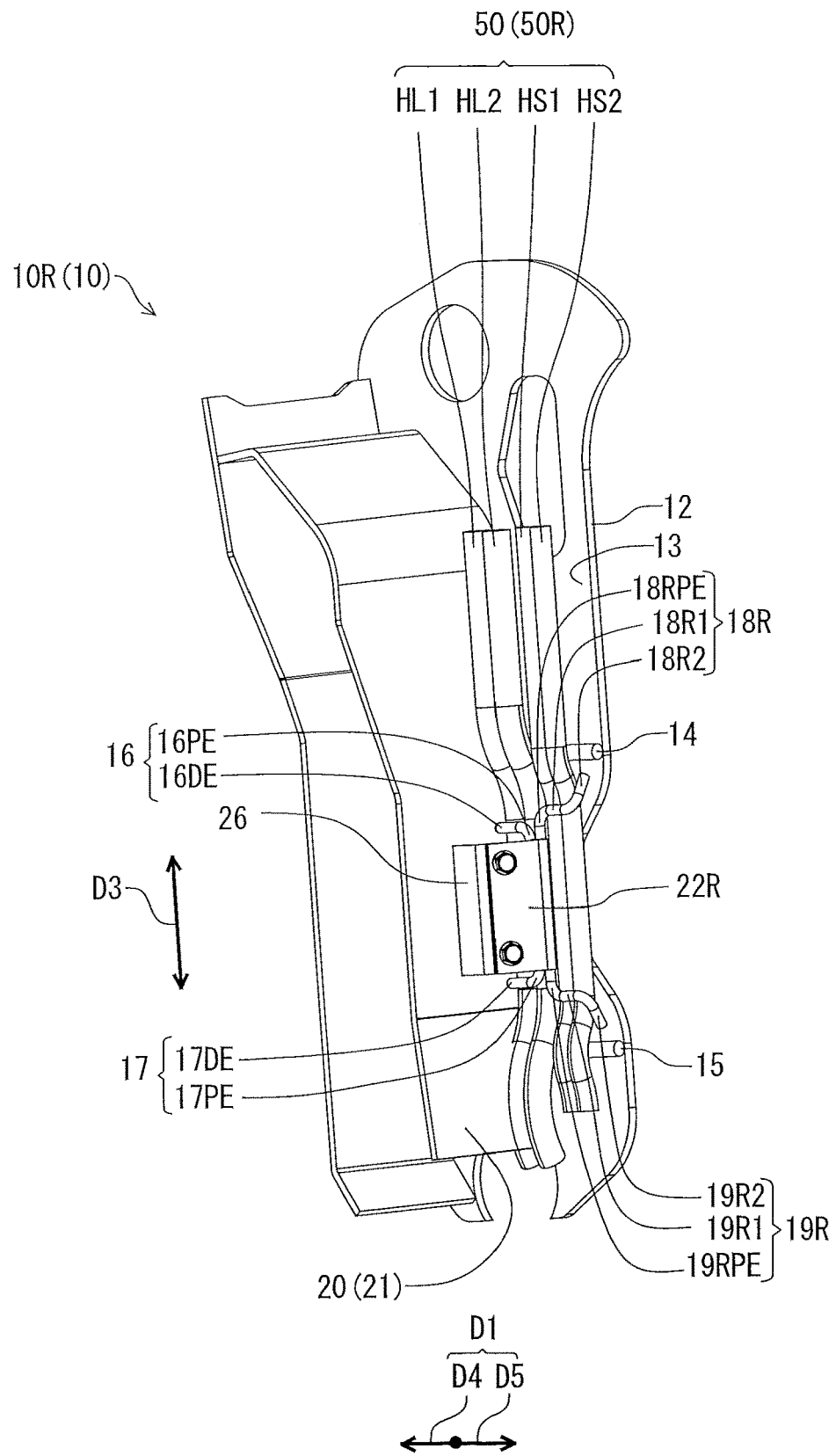
FIG. 4 is an enlarged perspective view of a second hose support structure.
Figure 5:
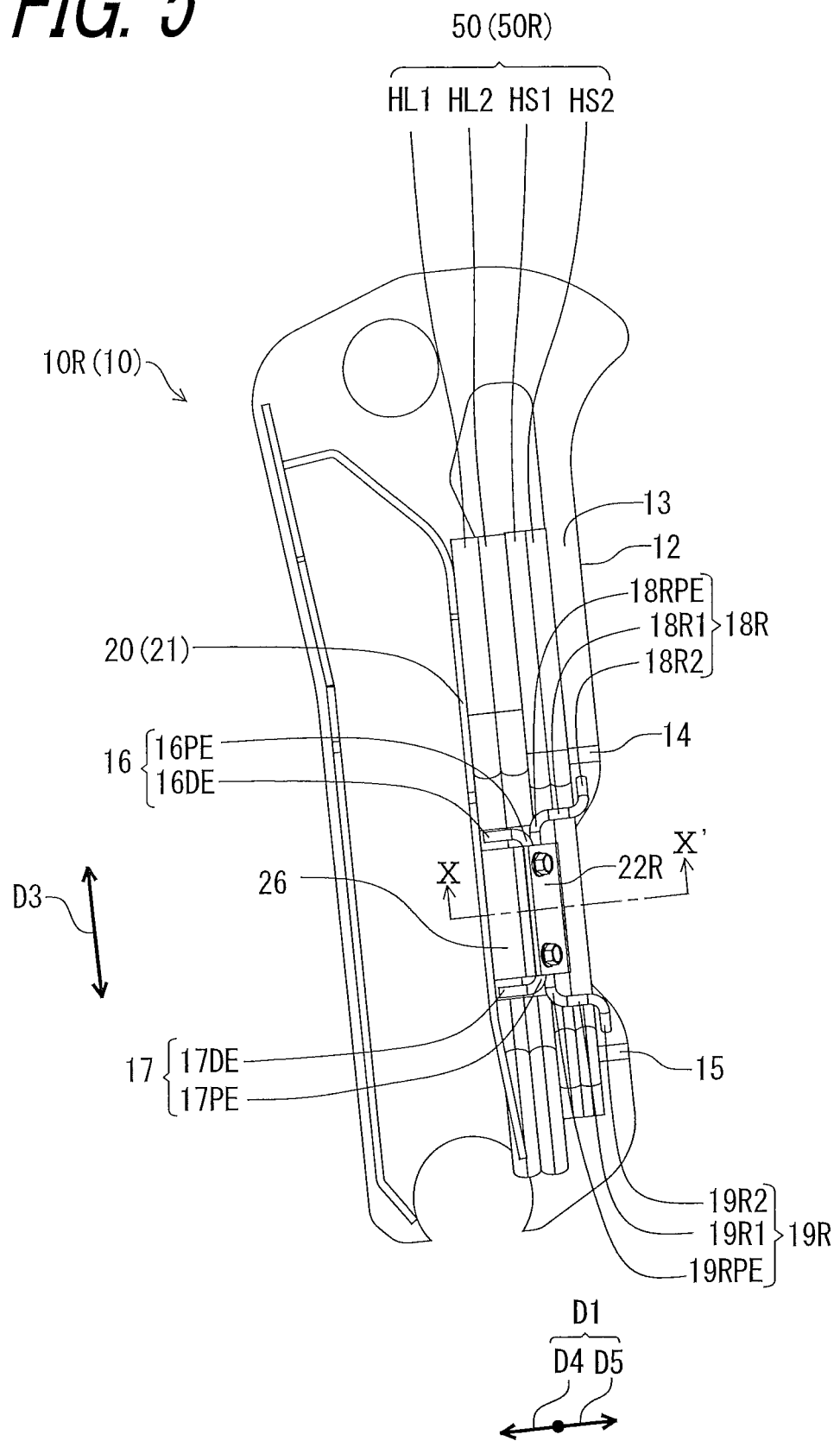
FIG. 5 is a right side view of the second hose support structure.
Figure 6:
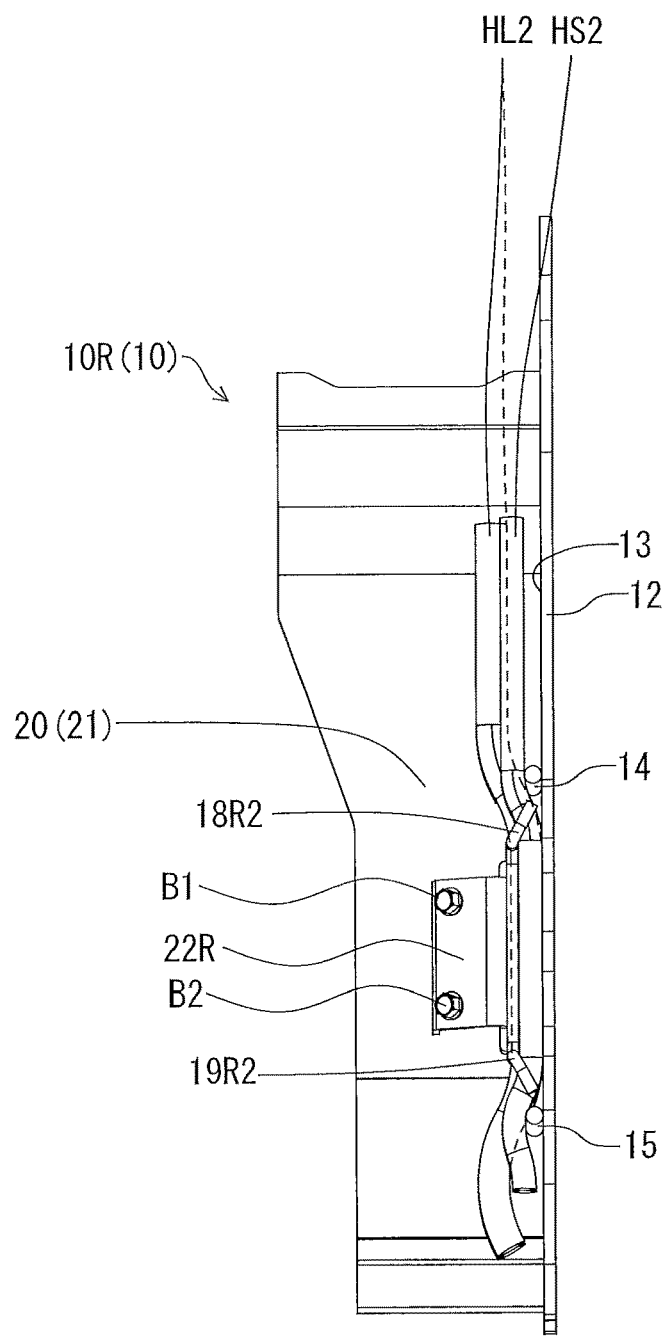
FIG. 6 is a front view of the second hose support structure.
Figure 7:
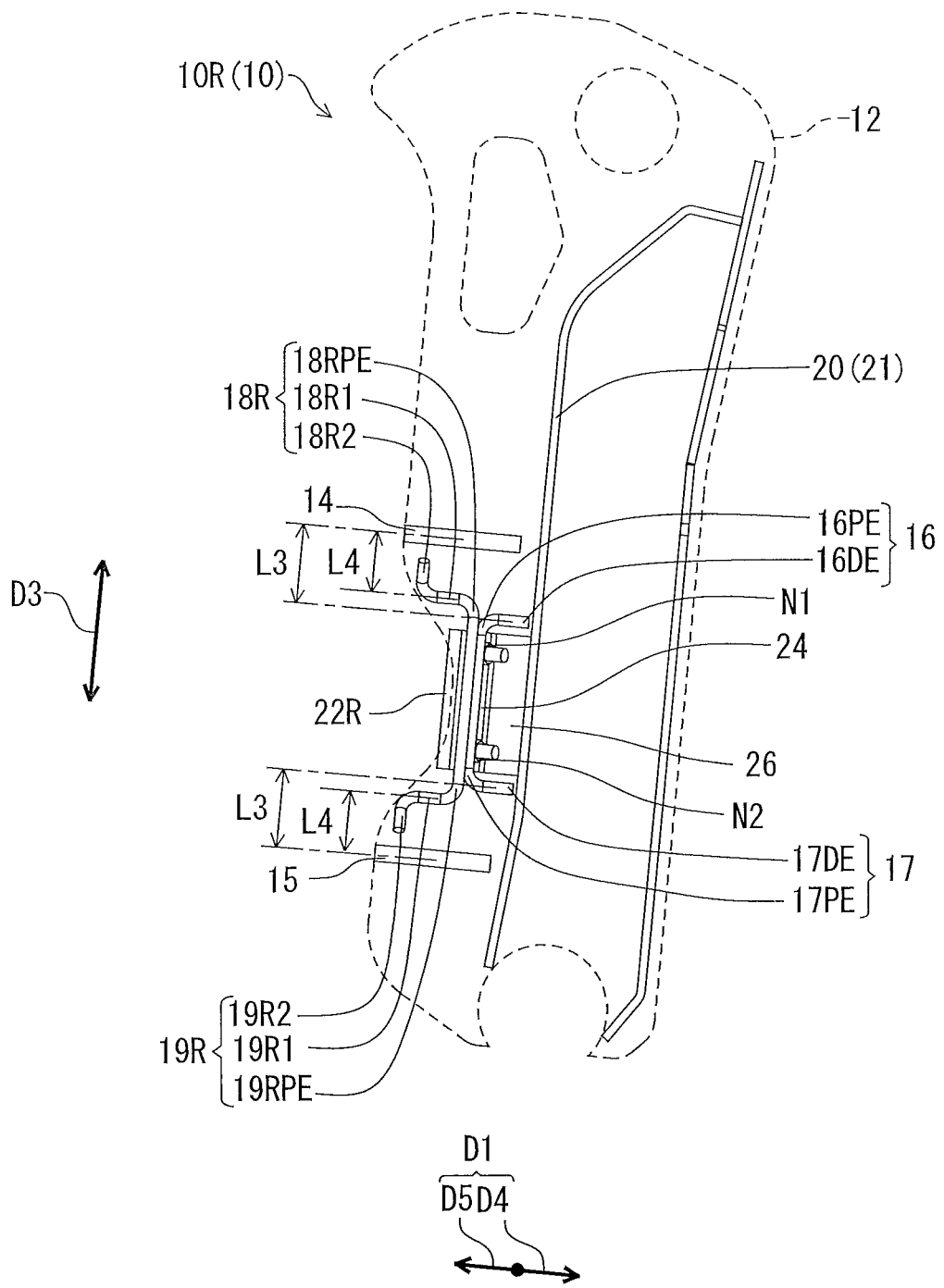
FIG. 7 is a left side view of the second hose support structure.
Figure 8:
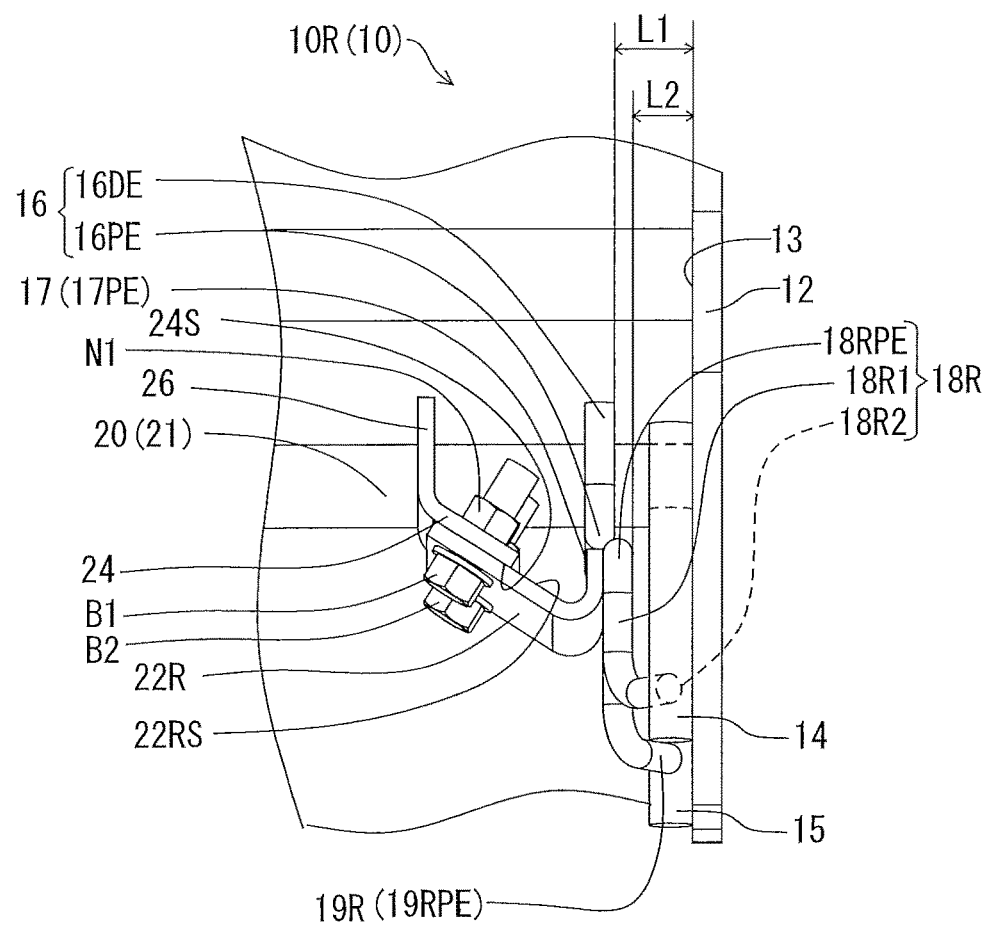
FIG. 8 is a top view of the second hose support structure when the hydraulic hose is removed.
Figure 8:
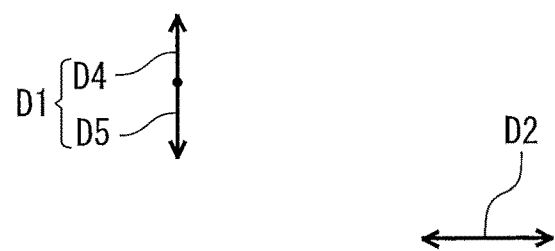

FIG. 4 is an enlarged perspective view of the second hose support structure 10R. FIG. 5 is a right side view of the second hose support structure 10R. FIG. 6 is a front view of the second hose support structure 10R. FIG. 7 is a left side view of the second hose support structure 10R. In FIGS. 4 to 6, in order to show the structure of the second hose support structure 10R in an easy-to-understand manner, a part of members of the second link 44R that are unrelated to the second hose support structure 10R are not shown. The plurality of hydraulic hoses 50R includes two large-diameter first hydraulic hoses HL1 and HL2 and two small-diameter second hydraulic hoses HS1 and HS2. The second hose support structure 10R is configured to support two large-diameter first hydraulic hoses HL1 and HL2 and two small-diameter second hydraulic hoses HS1 and HS2, however, it is not necessary to support the two second hydraulic hoses HS1 and HS2. In FIG. 6, a part of the outer shape of the first hydraulic hose HL2 which is not visible by the second hydraulic hoses HS1 and HS2 is indicated by a dotted line. In FIG. 7, in order to display the inner shape of the second hose support structure 10R, only the outer shape of the first plate member 12, which will be described later, is shown by a dotted line and the inner shape thereof is shown by a solid line. FIG. 8 is a top view of the second hose support structure when the hydraulic hoses HL1, HL2, HS1 and HS2 are removed.

Referring to FIGS. 4 to 8, the second hose support structure 10R includes the first plate member (the first plate) 12, a first round bar member (a first round bar) 14, a second round bar member (a second round bar) 15, a first restraint member (a first restraint) 16, an additional first restraint member (an additional first restraint) 17, a second restraint member (a second restraint) 18R, an additional second restraint member (an additional second restraint) 19R, a third restraint member (a third restraint) 20, an attachment 22R, an attachment support member (an attachment support) 24, and a third plate member (a third plate) 26. As shown in FIGS. 6 and 8, the first plate member 12 has a substantially flat mounting surface 13. As shown in FIGS. 6 to 8, the first round bar member 14 and the second round bar member 15 are provided on the mounting surface 13 and extend parallel to each other in the first direction D1.

As shown in FIG. 8, the first restraint member 16 is substantially perpendicular to the mounting surface 13 and facing the mounting surface 13 in a second direction D2 perpendicular to the first direction D1, and being separated from the mounting surface 13 by a first distance L1 in the second direction D2. In the present embodiment, the first restraint member 16 is shown as a round bar member, but can be a plate member. As shown in FIGS. 4, 5, and 7, the first restraint member 16 is provided between the first round bar member 14 and the second round bar member 15 in a third direction D3 perpendicular to first direction D1 and the second direction D2 and extends from a first proximal end 16PE toward a first distal end 16DE in a fourth direction along the first direction.

The second restraint member 18R faces the mounting surface 13 in the second direction D2, is provided between the first round bar member 14 and the second round bar member 15 in the third direction D3, and extends in a fifth direction D5 opposite to the fourth direction D4 from a second proximal end 18RPE that is connected to the first proximal end 16RPE of the first restraint member 16. The second restraint member 18R includes a first clip portion 18R1 extending from the second proximal end 18RPE in a fifth direction D5, and a second clip portion 18R2 bent from the first clip portion 18R1 and extending in a second direction D2 toward the first plate member 12. The second clip portion 18R2 extends in a direction from the first clip portion 18R1 toward the first round bar member 14. In the present embodiment, the second restraint member 18R is shown as a round bar member, but can be a plate member.

Figure 9:
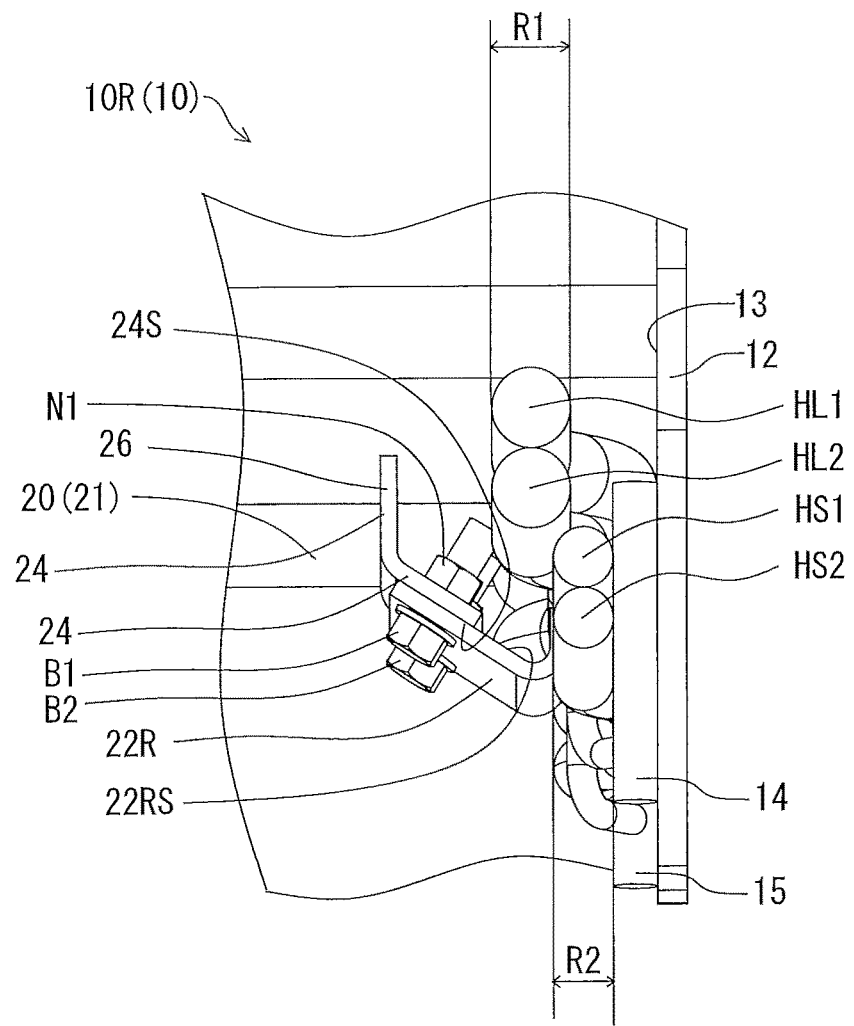
FIG. 9 is a top view of the second hose support structure with the hydraulic hose attached thereto.
Figure 9:
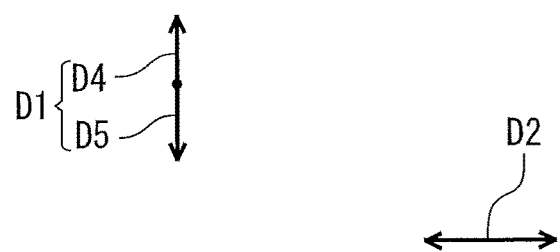

As shown in FIG. 8, at least a part of the second restraint member 18R is separated from the mounting surface 13 by a second distance L2 shorter than the first distance L1 in the second direction D2. More specifically, the first clip portion 18R1 is separated from the mounting surface 13 by a second distance L2 in the second direction D2. The second clip portion 18R2 is further closer to the mounting surface 13 in the second direction D2 than the first clip portion 18R1. FIG. 9 is a top view of the second hose support structure 10R when the hydraulic hoses HL1, HL2, HS1 and HS2 are mounted. The outer diameters (diameters) R2 of the second hydraulic hoses HS1 and HS2 are shorter than the outer diameters (diameters) R1 of the first hydraulic hoses HL1 and HL2. The first distance L1 described above is substantially equal to or slightly larger than the outer diameter R1 of the first hydraulic hoses HL1 and HL2. The second distance L2 is substantially equal to or slightly larger than the outer diameter (diameter) R2 of the second hydraulic hoses HS1 and HS2. (See also FIG. 10 as described below.)

The third restraint member 20 is provided opposite to the second restraint member 18R with respect to the first restraint member 16 in the first direction D1. In the present embodiment, the third restraint member 20 is a second plate member 21 substantially perpendicularly intersects the first plate member 12, but may be a round bar member connected to the first restraint member 16 or the second restraint member 18R.

The additional first restraint member 17 faces the mounting surface 13 in the second direction D2 and is separated from the mounting surface 13 by a first distance L1 in the second direction D2. The additional first restraint member 17 is provided between the first restraint member 16 and the second round bar member 15 in the third direction D3, and extends in the fourth direction D4 from the third proximal end 17PE to the third end 17DE. The additional first restraint member 17 has a shape symmetrical to that of the first restraint member 16 with respect to the cut plane X-X' shown in FIG. 5. In the present embodiment, as shown in FIG. 7, although the additional first restraint member 17 is formed by bending a round bar member integrated with the first restraint member 16, it may be a separate bar member or a separate plate member. Further, the first restraint member 16 and the additional first restraint member 17 may be formed of a plate member in which they are integrated.

The additional second restraint member 19R faces the mounting surface 13 in the second direction D2, is arranged between the second restraint member 18R and the second round bar member 15 in the third direction D3, and extends in the fifth direction D5 from a fourth proximal end 19RPE connected to the third proximal end 17PE of the additional first restraint member 17. The first restraint member 16 and the additional first restraint member 17 are provided between the second restraint member 18R and the additional second restraint member 19R in the third direction D3. The additional second restraint member 19R has a shape symmetrical to that of the second restraint member 18R with respect to the cut plane X-X' shown in FIG. 5. Accordingly, the additional second restraint member 19R includes a third clip portion 19R1 extending from the fourth proximal end 19RPE in the fifth direction D5, and a fourth clip portion 19R2 bent from the third clip portion 19R1 and extending in the second direction D2 toward the first plate member 12. In the present embodiment, as shown in FIG. 7, the additional second restraint member 19R is formed by retracting a round bar member integrated with the second restraint member 18R, but may be another rod-shaped member or another plate-shaped member. Further, the second restraint member 18R and the additional second restraint member 19R may be formed of a plate member in which they are integrated.

The attachment 22R is connected to a first proximal end 16PE of the first restraint member 16, a second proximal end 18RPE of the second restraint member 18R, a third proximal end 17PE of the additional first restraint member 17, and a fourth proximal end 19RPE of the additional second restraint member 19R. A first restraint member 16, an additional first restraint member 17, a second restraint member 18R, an additional second restraint member 19R, and an attachment 22R are detachably attached to the attachment support member 24. The attachment 22R is attached to the attachment support member 24 by bolts B1 and B2 and nuts N1 and N2. The attachment 22R is provided opposite to the first plate member 12 with respect to the first restraint member 16 and the additional first restraint member 17. As shown in FIGS. 8 and 9, the attachment 22R has a substantially flat mounting surface 22RS. The attachment support member 24 has a substantially flat support surface 24S that conforms to the shape of the mounting surface 22RS. The third plate member 26 faces the first plate member 12 in the second direction D2, and substantially perpendicularly intersects the second plate member 21. The attachment support member 24 is connected to the third plate member 26. The attachment support member 24 is connected to the first plate member 12 via the third plate member 26 and the third restraint member 20 (the second plate member 21).

Figure 10:
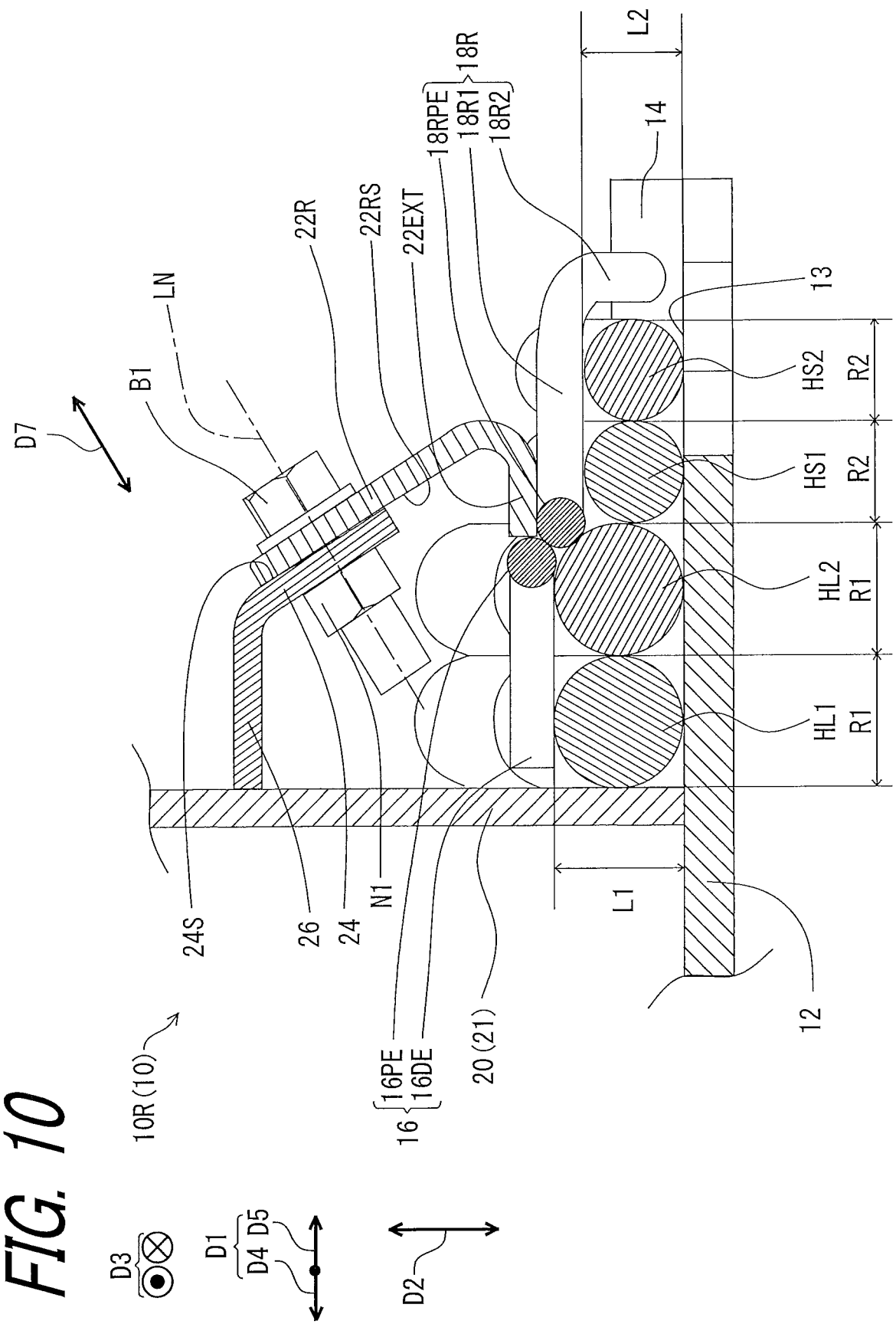
FIG. 10 is a cross-sectional view taken along the cross-sectional line X-X' of FIG. 5.

FIG. 10 is a cross-sectional view taken along the cut line X-X' of FIG. 5. The cut plane line X-X' passes through the center of the attachment 22R in the third direction D3. Referring to FIGS. 6, 9 and 10, considering that the additional first restraint member 17 has a shape symmetrical to the first restraint member 16 with respect to the cut plane X-X', and the additional second restraint member 19R has a shape symmetrical to the second restraint member 18R with respect to the cut plane X-X', the first hydraulic hoses HL1 and HL2 are sandwiched between the first plate member 12, the first round bar member 14, the second round bar member 15, the first restraint member 16 and the additional first restraint member 17. The second hydraulic hoses HS1 and HS2 are sandwiched between the first plate member 12, the first round bar member 14, the second round bar member 15, the second restraint member 18R, and the additional second restraint member 19R.

Referring to FIG. 10, the second proximal end 18RPE protrudes in the second direction D2 from the first restraint member 16 toward the mounting surface 13. Therefore, the second proximal end 18RPE can support the side surface of the first hydraulic hose HL2. Similarly, the fourth proximal end 19RPE protrudes in the second direction D2 toward the mounting surface 13 more than the additional first restraint member 17. Therefore, the fourth proximal end 19RPE can support the side surface of the first hydraulic hose HL2. Therefore, even if the second hydraulic hoses HS1 and HS2 are not provided on the second link 44R, the second hose support structure 10R can stably support the first hydraulic hoses HL1 and HL2.

Referring further to FIG. 10, the normal line LN of the support surface 24S extends in a seventh direction inclined from the fourth direction toward the placement surface. Therefore, when the attachment 22R is attached to the attachment support member 24, the first restraint member 16, the additional first restraint member 17, the second restraint member 18R, and the additional second restraint member 19R can press the first hydraulic hoses HL1 and HL2 and the second hydraulic hoses HS1 and HS2 toward the first plate member 12 and the second plate member 21. Therefore, the first hydraulic hoses HL1 and HL2 are stably fixed to the second hydraulic hoses HS1 and HS2 by attaching the attachment 22R.

The distance L3 in the third direction D3 between the first restraint member 16 (the first distal end 16DE) and the first round bar member 14 shown in FIG. 7 is provided so that the bending radius of the bent portion of the second hydraulic hoses HS1 and HS2 formed by the first round bar member 14 and the first restraint member 16 is not more than six times the outer diameter of the second hydraulic hoses HS1 and HS2. In other words, the distance L3 between the additional first restraint member 17 (the third distal end 17DE) and the second round bar member 15 is set so that the bending radius of the bent portions of the first hydraulic hoses HL1 and HL2 formed by the second round bar member 15 and the additional first restraint member 17 is not more than six times the outer diameter of the first hydraulic hoses HL1 and HL2. The distance L3 shown in FIG. 7 is the distance in the third direction D3 between the central axis of the first round bar member 14 and the central axis of the first distal end 16DE, and the distance in the third direction D3 between the central axis of the second round bar member 15 and the central axis of the third end 17DE.

The second restraint member 18R (first clip portion 18R1) as shown in FIG. 7 and the distance L4 between the first round bar member 14 and the first round bar member 14 in the third direction D3 is so arranged that the bending radius of the bent portion of the second hydraulic hoses HS1 and HS2 formed by the first round bar member 14 and the second restraint member 18R is not more than five times the outer diameter of the second hydraulic hoses HS1 and HS2. In other words, the distance L3 in the third direction D3 between the additional second restraint member 19R (third clip portion 19R1) and the second round bar member 15 is set so that the bending radius of the bent portion of the second hydraulic hoses HS1 and HS2 formed by the second round bar member 15 and the additional second restraint member 19R is within five times the outer diameter of the second hydraulic hoses HS1 and HS2. The distance L4 shown in FIG. 7 is the distance in the third direction D3 between the center axis of the first round bar member 14 and the center axis of the first clip portion 18R1, and the distance in the third direction D3 between the center axis of the second round bar member 15 and the center axis of the third clip portion 19R1.

Figure 11:
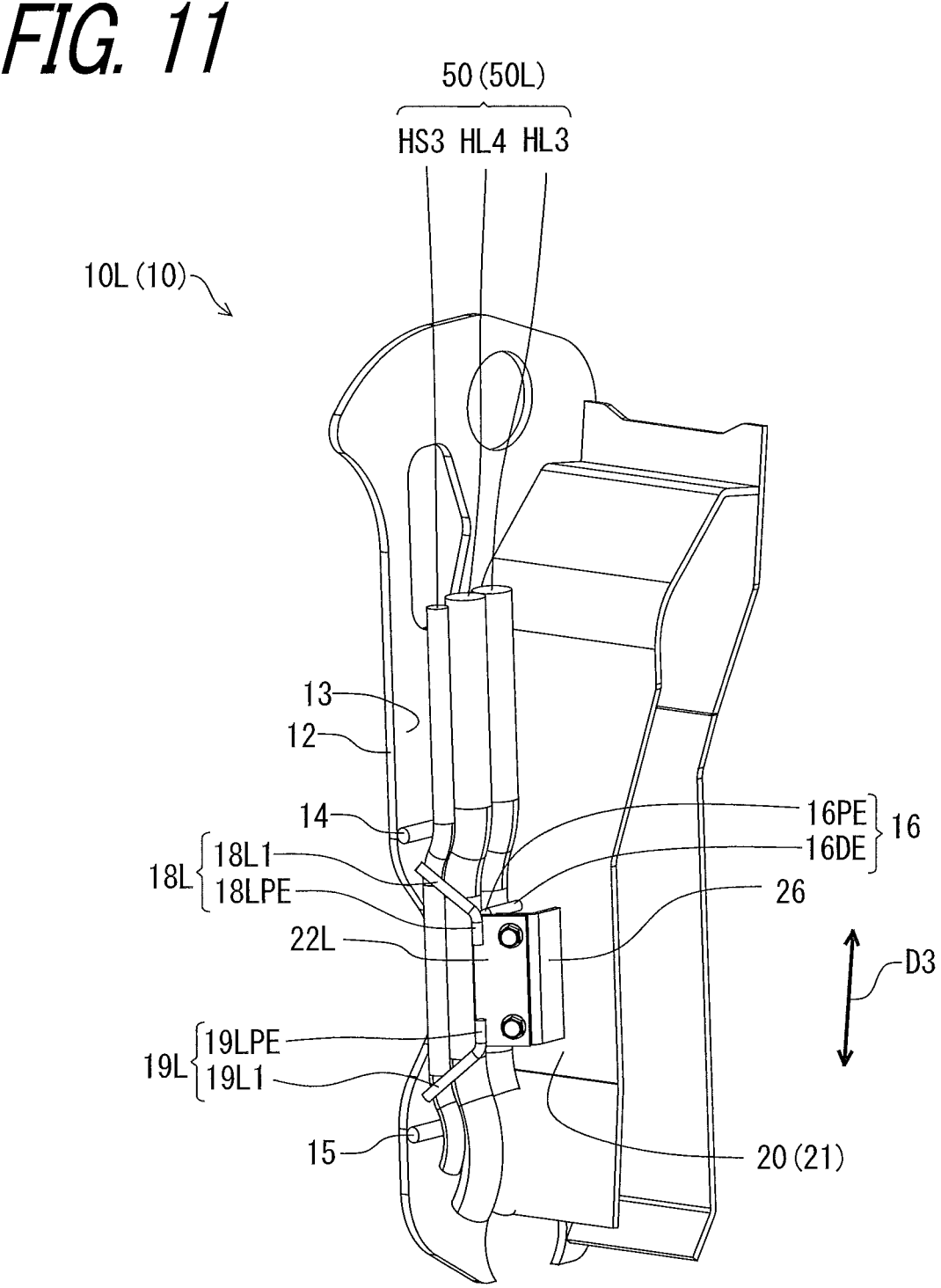
FIG. 11 is an enlarged perspective view of the first hose support structure.
Figure 12:
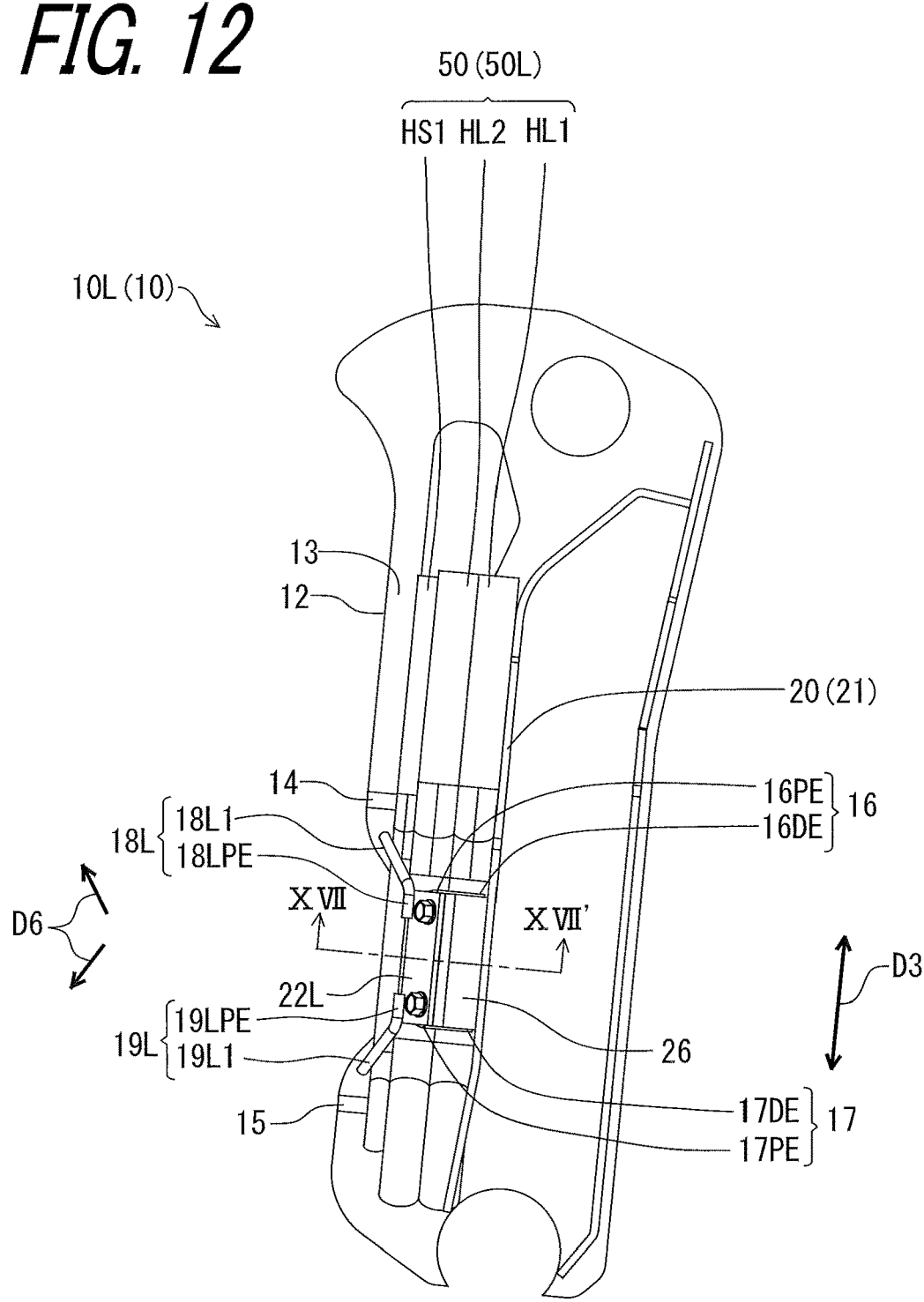
FIG. 12 is a left side view of the first hose support structure.
Figure 12:
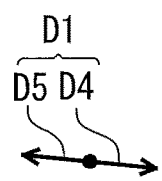
Figure 13:
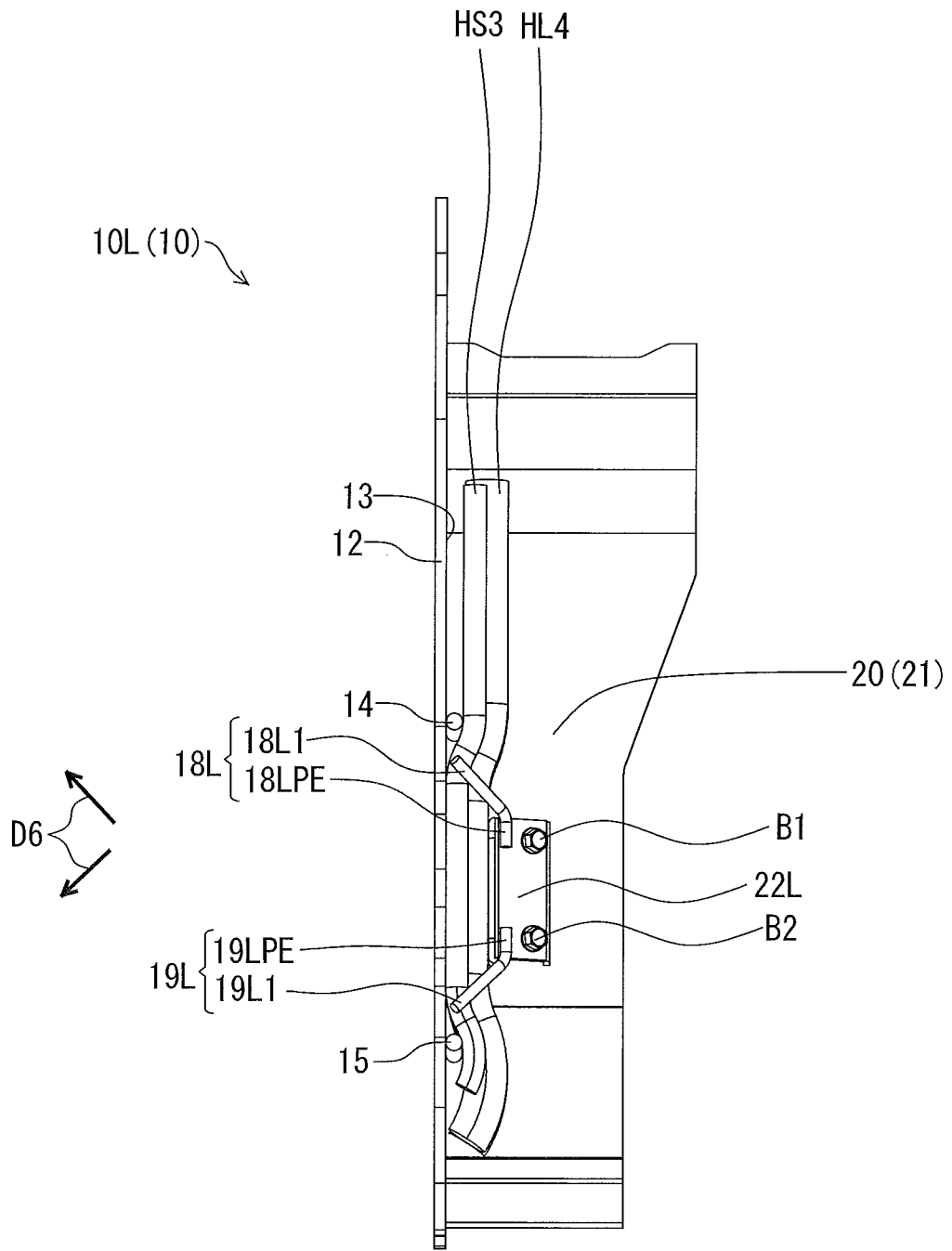
FIG. 13 is a front view of the first hose support structure.
Figure 14:
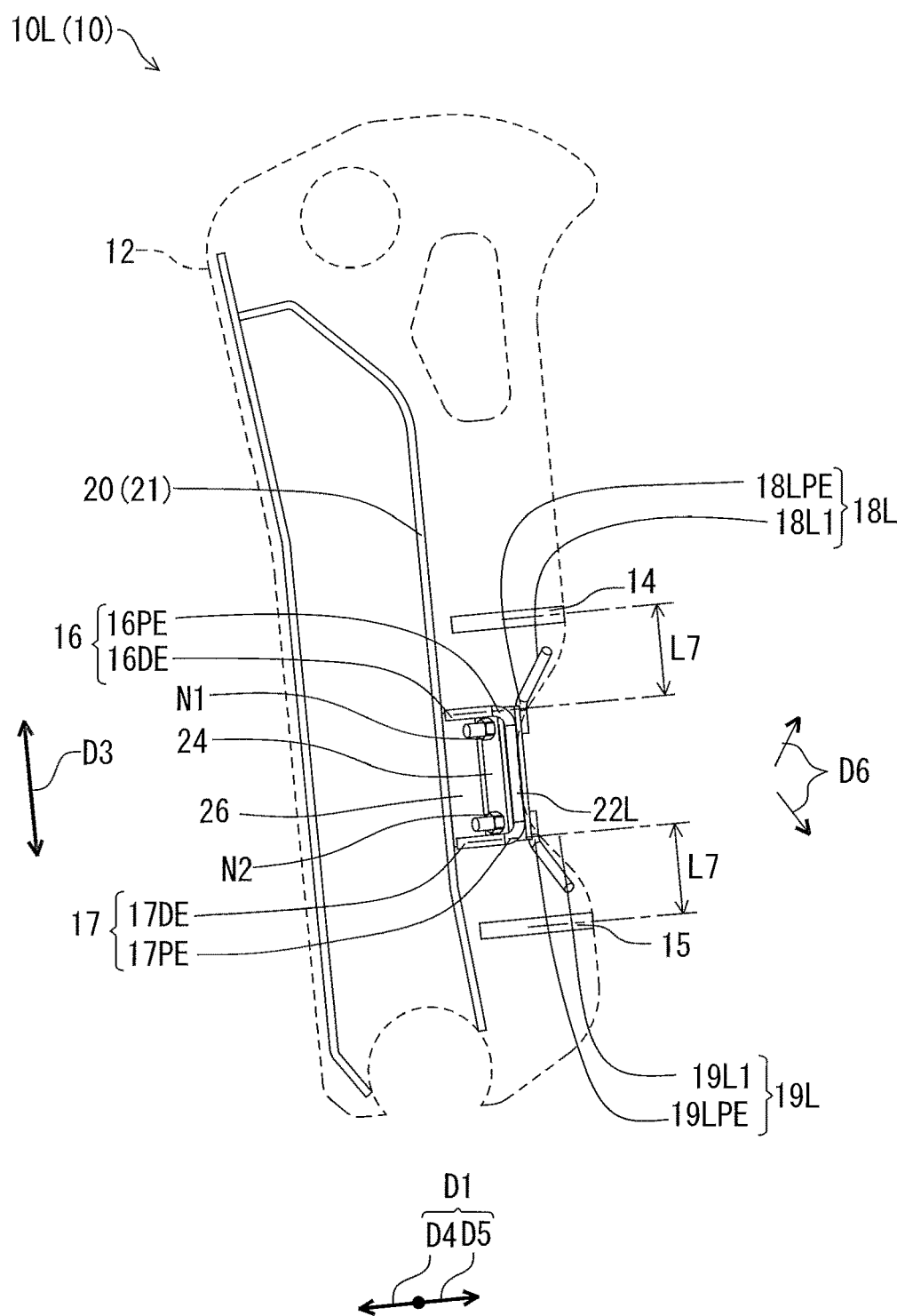
FIG. 14 is a right side view of the first hose support structure.
Figure 15:
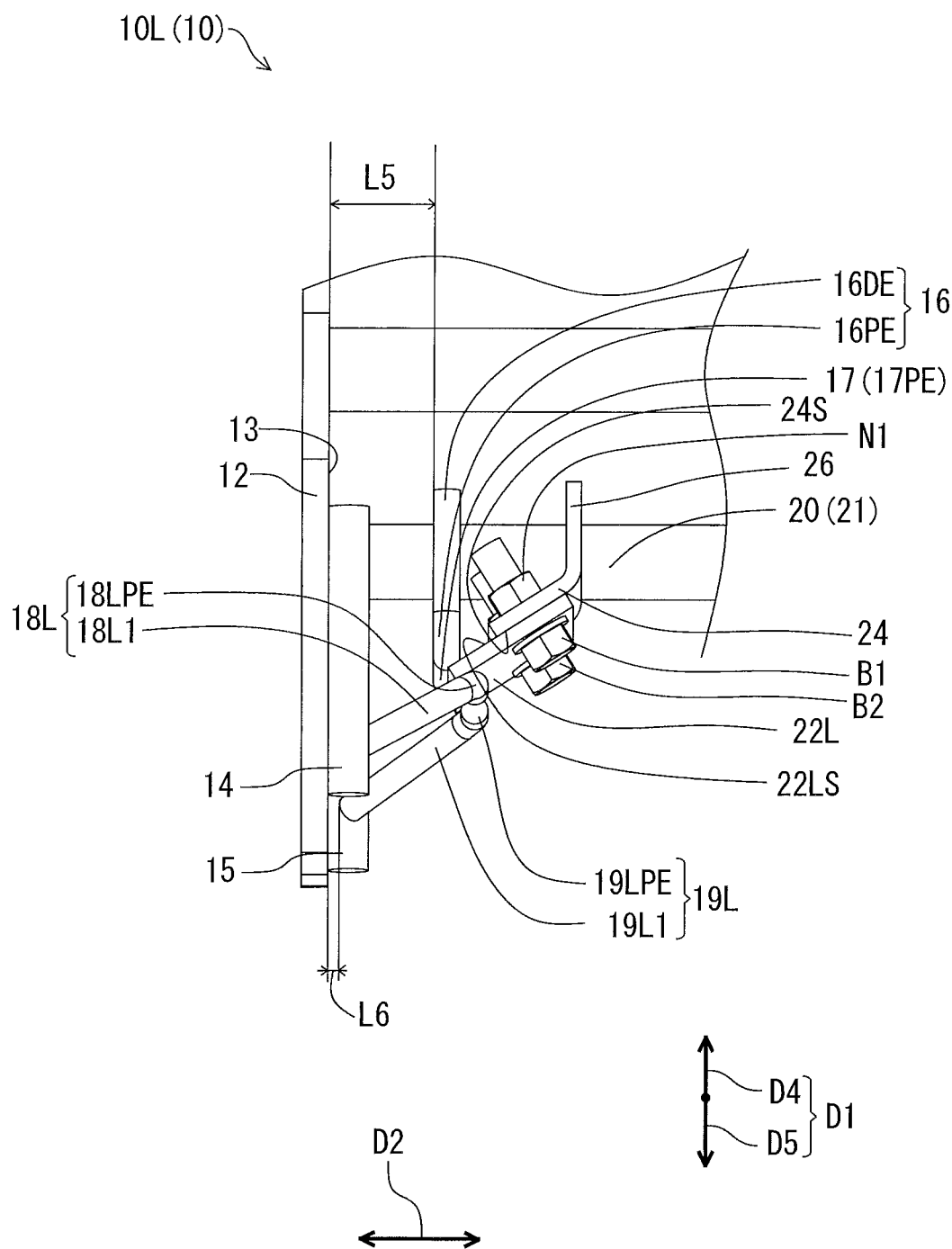
FIG. 15 is a top view of the first hose support structure when the hydraulic hose is removed.

FIG. 11 is an enlarged perspective view of the first hose support structure 10L. FIG. 12 is a left side view of the first hose support structure 10L. FIG. 13 is a front view of the first hose support structure 10L. FIG. 14 is a right side view of the first hose support structure 10L. In FIGS. 11 to 14, in order to display the structure of the first hose support structure 10L in an easy-to-understand manner, the illustration of a part of members of the first link 44L unrelated to the first hose support structure 10L is omitted. The plurality of hydraulic hoses 50L includes two large-diameter first hydraulic hoses HL3 and HL4 and one small-diameter second hydraulic hose HS3. The first hose support structure 10L is configured to support two large diameter first hydraulic hoses HL3 and HL4 and one small diameter second hydraulic hose HS3. In FIG. 14, in order to display the inner shape of the first hose support structure 10L, only the outer shape of the first plate member 12 is shown by a dotted line, and the inner shape thereof is shown by a solid line. FIG. 15 is a top view of the first hose support structure 10L when the hydraulic hoses HL3, HL4 and HS3 are removed. Since the first hose support structure 10L has the same configuration as the second hose support structure 10R except for the second restraint member 18L, the additional second restraint member 19L, and the attachment 22L, the same reference numerals are assigned to the first hose support structure 10L. Detailed description of these configurations will be omitted.

Referring to FIGS. 11 to 15, the first hose support structure 10L includes a first plate member 12, a first round bar member 14, a second round bar member 15, a first restraint member 16, an additional first restraint member 17, a second restraint member 18L, an additional second restraint member 19L, a third restraint member 20, an attachment 22L, an attachment support member 24, and a third plate member 26. In other words, the hose support structure 10 includes a first plate member 12, a first round bar member 14, a second round bar member 15, a first restraint member 16, an additional first restraint member 17, a second restraint member 18L (18R), an additional second restraint member 19L (19R), a third restraint member 20, an attachment 22L (22R), an attachment support member 24, and a third plate member 26.

The second restraint member 18L faces the mounting surface 13 in the second direction D2, is arranged between the first round bar member 14 and the second round bar member 15 in the third direction D3, and extends in a fifth direction D5 opposite to the fourth direction D4 from a second proximal end 18LPE connected to the first proximal end 16PE of the first restraint member 16 via an attachment 22L. The second restraint member 18L includes a first pressing portion 18L1 extending from the second proximal end 18LPE in the fifth direction D5. More specifically, the first pressing portion 18L1 extends in a sixth direction D6 inclined from the fifth direction D5 toward the first plate member 12. That is, the second restraint member 18L extends in the sixth direction D6 inclined from the fifth direction D5 toward the first plate member 12. In this embodiment, the second restraint member 18L is shown as a round bar member, but may be a plate member.

Figure 16:
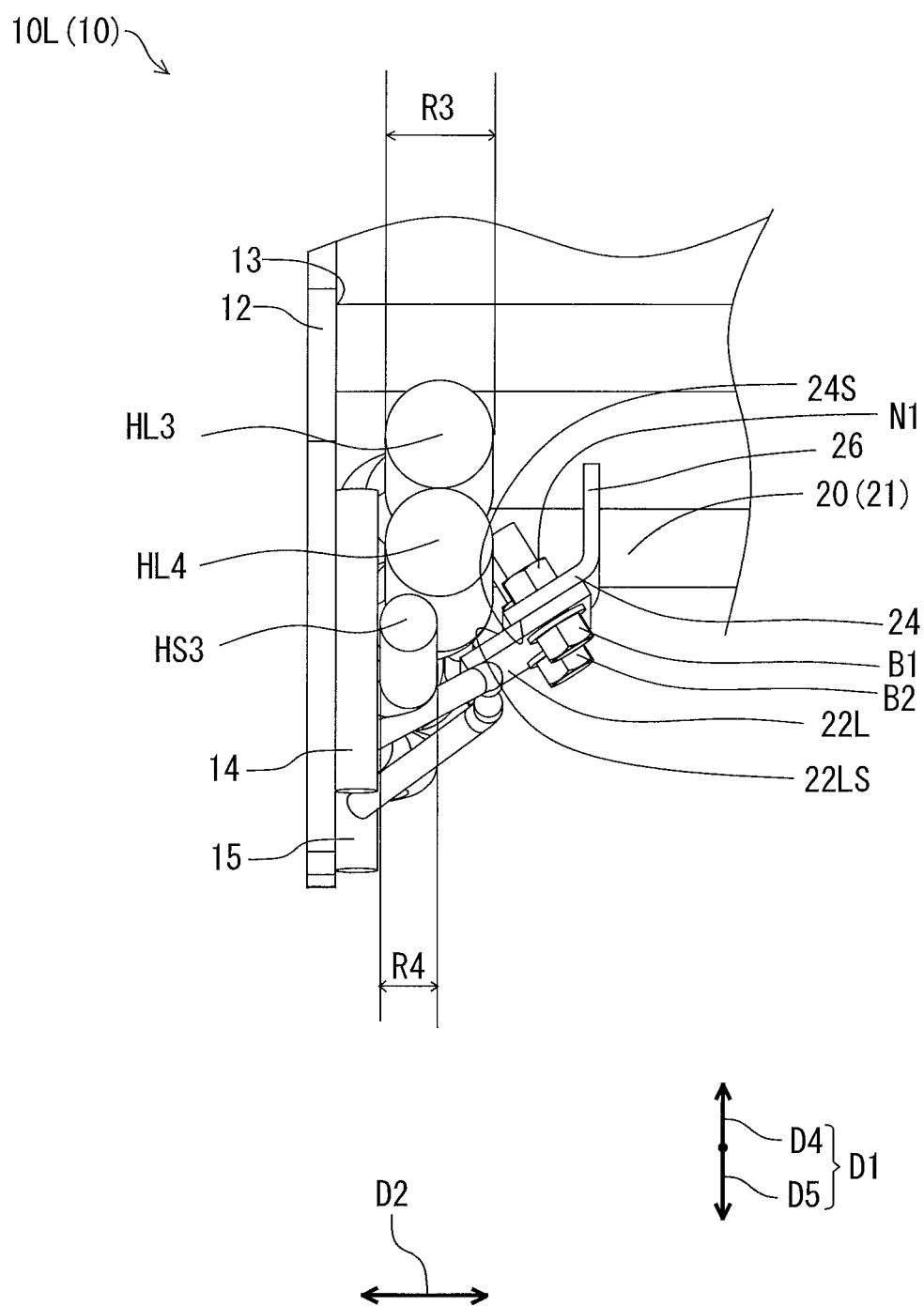
FIG. 16 is a top view of the first hose support structure with the hydraulic hose attached thereto.

As shown in FIG. 15, the first restraint member 16 is separated from the mounting surface 13 by a first distance L5 in the second direction D2. This first distance L5 is equal to the first distance L1 of the second hose support structure 10R. In the illustrated embodiment, the distance L5 is longer than the distance L1. At least a part of the second restraint member 18L is separated from the mounting surface 13 by a second distance L6 shorter than the first distance L5 in the second direction D2. More specifically, the tip end of the first pressing portion 18L1 is separated from the mounting surface 13 by a second distance L6 in the second direction D2. FIG. 16 is a top view of the first hose support structure 10L with the hydraulic hoses HL3, HL4, and HS3 attached thereto. An outer diameter (diameter) R4 of the second hydraulic hose HS3 is shorter than an outer diameter (diameter) R3 of the first hydraulic hoses HL3 and HL4. In the illustrated embodiment, the outer diameter R4 is substantially equal to the outer diameter R2, and the outer diameter R3 is longer than the outer diameter R1. The first distance L5 described above is substantially equal to or slightly larger than the outer diameter R3 of the first hydraulic hoses HL3 and HL4. The second distance L6 is shorter than the outer diameter (diameter) R4 of the second hydraulic hose HS3. (See also FIG. 17 as described below)

The additional second restraint member 19L faces the mounting surface 13 in the second direction D2, is arranged between the second restraint member 18L and the second round bar member 15 in the third direction D3, and extends in the fifth direction D5 from a fourth proximal end 19LPE connected to the third proximal end 17PE of the additional first restraint member 17 via an attachment 22L. The first restraint member 16 and the additional first restraint member 17 are provided between the second restraint member 18L and the additional second restraint member 19L in the third direction D3. The additional second restraint member 19L has a shape symmetrical to that of the second restraint member 18L with respect to the cut plane XVII-XVII' shown in FIG. 12. Accordingly, the additional second restraint member 19L includes a third pressing portion 19L1 extending in the fifth direction D5 from the fourth proximal end 19LPE. More specifically, the third pressing portion 19L1 extends in a sixth direction D6 inclined from the fifth direction D5 toward the first plate member 12. That is, the additional second restraint member 19L extends in the sixth direction D6 inclined from the fifth direction D5 toward the first plate member 12. In the present embodiment, as shown in FIG. 14, the additional second restraint member 19L is a round bar member, but can be a plate member. Further, the second restraint member 18L and the additional second restraint member 19L may be formed of a plate member in which they are integrated.

The attachment 22L is connected to a first proximal end 16PE of the first restraint member 16, a second proximal end 18LPE of the second restraint member 18L, a third proximal end 17PE of the additional first restraint member 17, and a fourth proximal end 19LPE of the additional second restraint member 19LPE. The first restraint member 16, the additional first restraint member 17, the second restraint member 18L, the additional second restraint member 19L, and the attachment 22L are detachable from the attachment support member 24. The attachment 22L is attached to the attachment support member 24 by bolts B1 and B2 and nuts N1 and N2. As shown in FIGS. 15 and 16, the attachment 22L has a substantially flat mounting surface 22LS. The attachment support member 24 has a substantially flat support surface 24S that conforms to the shape of the mounting surface 22LS.

The attachment 22L for attaching the first hose support structure 10L differs from the attachment 22R for attaching the second hose support structure 10R in the following points because the outer diameters of the first hydraulic hoses HL3 and HL4 are different from the outer diameters of the first hydraulic hoses HL1 and HL2. Referring to FIG. 10, the attachment 22R has an extended portion 22EXT for supporting the first restraint member 16 at a position close to the first plate member 12. However, referring to FIG. 17, the attachment 22L does not have an extended portion 22EXT.

FIG. 17 is a cross-sectional view taken along the cut line XVII-XVII' of FIG. 12. The cut plane line XVII-XVII' passes through the center of the attachment 22R in the third direction D3. Referring to FIGS. 13, 16 and 17, considering that the additional second restraint member 19L has a shape symmetrical to that of the second restraint member 18L with respect to the cut plane XVII-XVII', the second hydraulic hose HS3 is sandwiched between the first plate member 12, the first round bar member 14, the second round bar member 15, the second restraint member 18L, and the additional second restraint member 19L.

The bending radius of the bent portion of the second hydraulic hose HS3 formed by the first round bar member 14 and the second restraint member 18L is set to be within five times the outer diameter of the second hydraulic hose HS3. The bending radius of the bent portion of the second hydraulic hose HS3 formed by the second round bar member 15 and the additional second restraint member 19L is set to be within five times the outer diameter of the second hydraulic hose HS3.

Operation and Effect of the Embodiments

The hose support structure 10 is provided with a first plate member 12, a first round bar member 14, a second round bar member 15, a first restraint member 16, a second restraint member 18R (18L), and a third restraint member 20. At least a part of the second restraint member 18R (18L) is separated from the mounting surface 13 by a second distance L2 (L6) shorter than the first distance L1 (L5) in the second direction D2. Therefore, it is possible to provide a simple hose support structure in which hoses having different diameters are engaged and abrasion of the hoses is suppressed when the working device 4 is moved.

As used herein, "comprising" and its derivatives are non-limiting terms that describe the presence of a component, and do not exclude the presence of other components not described. This also applies to "having", "including" and their derivatives.

The term's "member," "part," "element," "body," and "structure" may have multiple meanings, such as a single part or multiple parts.

Ordinal numbers such as "first" and "second" are simply terms used to identify configurations and do not have other meanings (e.g., a particular order). For example, the presence of the "first element" does not imply the presence of the "second element", and the presence of the "second element" does not imply the presence of the "first element".

Terms such as "substantially", "about", and "approximately" indicating degrees can mean reasonable deviations such that the final result is not significantly altered, unless otherwise stated in the embodiments. All numerical values described herein may be interpreted to include words such as "substantially," "about," and "approximately."

In the present application, the phrase "at least one of A and B" should be interpreted to include only A, only B, and both A and B.

In view of the above disclosure, it will be apparent that various changes and modifications of the present invention are possible. Therefore, the present invention may be carried out by a method different from the specific disclosure of the present application without departing from the spirit of the present invention.

What is claimed is:
1. A hose support structure comprising:
a first plate having a mounting surface;
a first round bar and a second round bar provided on the mounting surface and extending parallel to each other in a first direction;

a first restraint facing the mounting surface in a second direction substantially perpendicular to the mounting surface and perpendicular to the first direction and separated from the mounting surface by a first distance in the second direction, the first restraint provided between the first round bar and the second round bar in a third direction perpendicular to the first and second directions and extending from a first proximal end toward a first distal end in a fourth direction along the first direction;

a second restraint facing the mounting surface in the second direction and provided between the first round bar and the second round bar in the third direction, the second restraint extending in a fifth direction opposite to the fourth direction from a second proximal end that is connected to the first proximal end of the first restraint;

a third restraint provided opposite to the second restraint with respect to the first restraint in the first direction; and at least a part of the second restraint being separated from the mounting surface by a second distance shorter than the first distance in the second direction.

2. The hose support structure according to claim 1, wherein the second proximal end protrudes from the first restraint toward the mounting surface in the second direction.

3. The hose support structure according to claim 2, wherein the second restraint includes
a first clip portion extending from the second proximal end in the fifth direction, and
a second clip portion bent from the first clip portion and extending in the second direction toward the first plate.

4. The hose support structure according to claim 3, further comprising:

an attachment connected to the first proximal end of the first restraint and the second proximal end of the second restraint and provided opposite to the first plate with respect to the first restraint, the attachment having a mounting surface; and an attachment support connected to the first plate member and having a support surface that fits a shape of the mounting surface of the attachment, the first restraint, the second restraint, and the attachment being detachable from the attachment support.

5. The hose support structure according to claim 2, further comprising:

an attachment connected to the first proximal end of the first restraint and the second proximal end of the second restraint and provided opposite to the first plate with respect to the first restraint, the attachment having a mounting surface; and an attachment support connected to the first plate member and having a support surface that fits a shape of the mounting surface of the attachment, the first restraint, the second restraint, and the attachment being detachable from the attachment support.

6. The hose support structure according to claim 1, wherein the second restraint extends in a sixth direction inclined from the fifth direction toward the first plate.

7. The hose support structure according to claim 6, further comprising:

an attachment connected to the first proximal end of the first restraint and the second proximal end of the second restraint and provided opposite to the first plate with respect to the first restraint, the attachment having a mounting surface; and an attachment support connected to the first plate member and having a support surface that fits a shape of the mounting surface of the attachment, the first restraint, the second restraint, and the attachment being detachable from the attachment support.

8. The hose support structure according to claim 1, further comprising:

an attachment connected to the first proximal end of the first restraint and the second proximal end of the second restraint and provided opposite to the first plate with respect to the first restraint, the attachment having a mounting surface; and an attachment support connected to the first plate member and having a support surface that fits a shape of the mounting surface of the attachment, the first restraint, the second restraint, and the attachment being detachable from the attachment support.

9. The hose support structure according to claim 8, wherein a normal line of the support surface extends in a seventh direction inclined from the fourth direction toward the mounting surface.

10. The hose support structure according to claim 9, wherein the third restraint is a second plate which substantially perpendicularly intersects with the first plate.

11. The hose support structure according to claim 8, wherein the third restraint is a second plate which substantially perpendicularly intersects with the first plate.

12. The hose support structure according to claim 11, further comprising:

a third plate facing the first plate in the second direction and substantially perpendicularly intersecting with the second plate, the attachment support being connected to the third plate.

13. The hose support structure according to claim 1, further comprising:

an additional first restraint facing the mounting surface in the second direction and provided between the first restraint and the second round bar in the third direction and separated from the mounting surface by the first distance in the second direction, and extends in the fourth direction from a third proximal end to a third distal end; and an additional second restraint facing the mounting surface in the second direction and provided between the second restraint and the second round bar in the third direction, the additional second restraint extending in the fifth direction from a fourth proximal end connected to the third proximal end of the additional first restraint, the first restraint and the additional first restraint being provided between the second restraint and the additional second restraint in the third direction.

14. The hose support structure according to claim 13, wherein the first restraint, the additional first restraint, the second restraint, and the additional second restraint are round bars.

15. The hose support structure according to claim 14, wherein the first restraint and the additional first restraint are each formed by bending an integral round bar.

16. The hose support structure according to claim 14, wherein the second restraint and the additional second restraint are each formed by bending an integral round bar.

17. A link for a work vehicle comprising the hose support structure according to claim 1.

18. A work vehicle comprising:
the link according to claim 17; and
a first hydraulic hose sandwiched in the first plate, the first round bar, the second round bar member, and the first restraint.

19. The work vehicle according to claim 18, further comprising:
a second hydraulic hose sandwiched in the first plate member, the first round bar member, the second round bar member, and the second restraint, an outer diameter of the second hydraulic hose being shorter than an outer diameter of the first hydraulic hose.

20. The work vehicle according to claim 18, wherein a bending radius of a bent portion of the first hydraulic hose which is formed by the first round bar and the first restraint is within six times an outer diameter of the first hydraulic hose.

* * * * *